Aug. 19, 1924.
H. L. TURNEY
1,505,509
GEARED LOCOMOTIVE
Filed Aug. 11, 1923    2 Sheets-Sheet 1
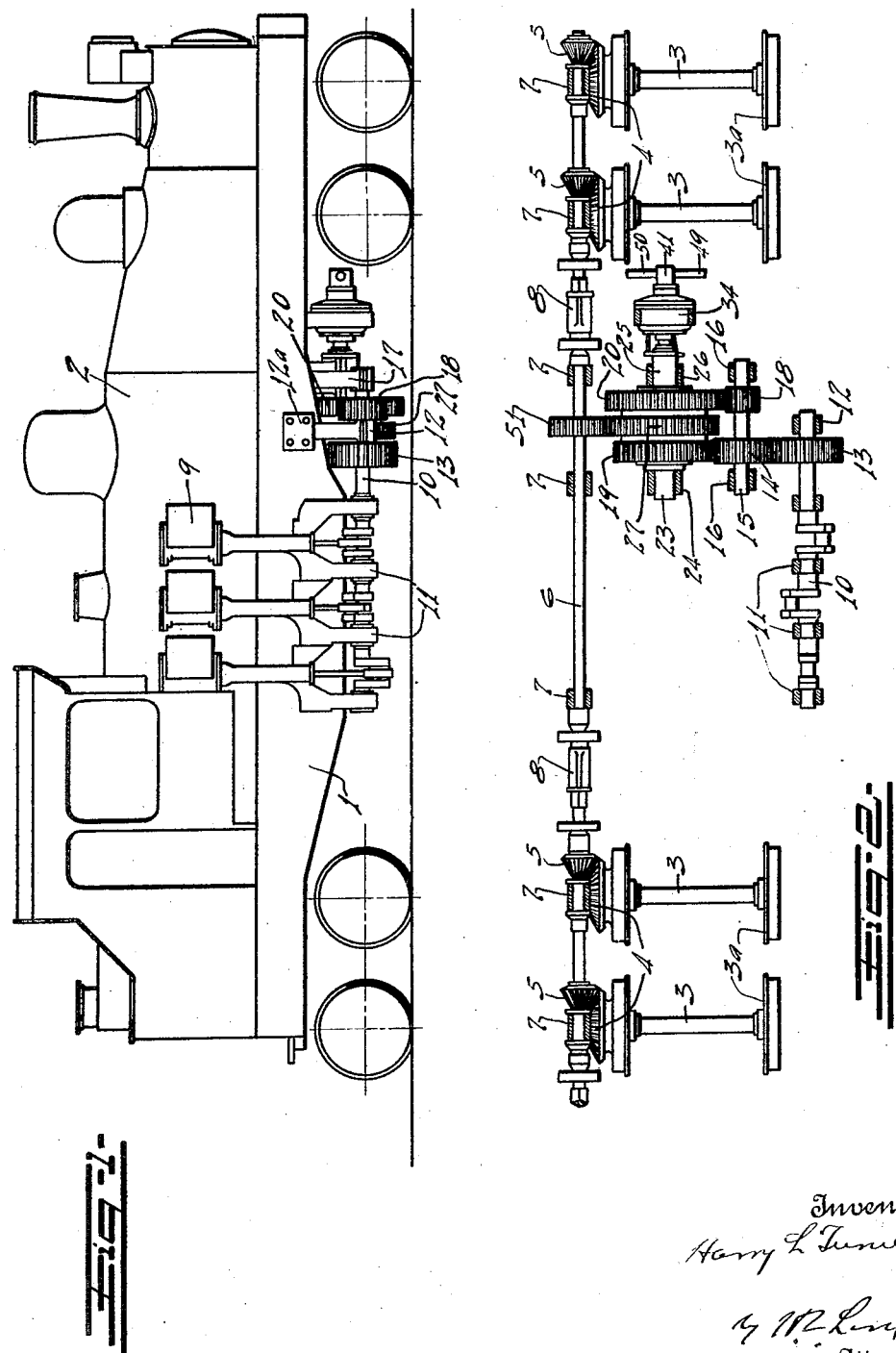
Inventor
Harry L. Turney
Attorney Aug. 19, 1924.
H. L. TURNEY
GEARED LOCOMOTIVE
Filed Aug. 11, 1923
1,505,509
2 Sheets-Sheet 2
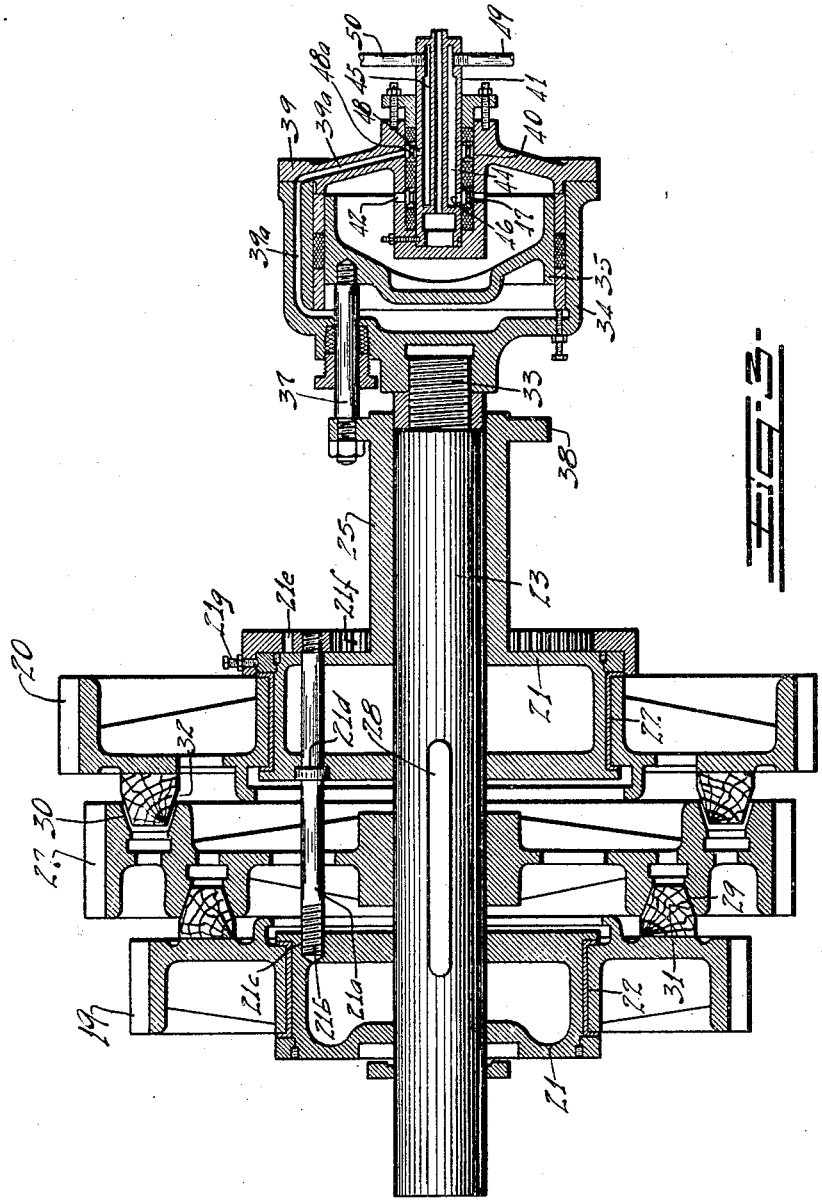

Patented Aug. 19, 1924.

1,505,509

UNITED STATES PATENT OFFICE.

HARRY L. TURNEY, OF PORTLAND, OREGON.

GEARED LOCOMOTIVE.

Application filed August 11, 1923. Serial No. 656,885.

*To all whom it may concern:*

Be it known that I, HARRY L. TURNEY, a citizen of the United States, residing at Portland, in the county of Multnomah and State of Oregon, have invented new and useful Improvements in Geared Locomotives, of which the following is a specification.

Geared locomotives as heretofore made have been constructed with a longitudinal driving shaft and engines mounted at one side of the frame and boiler, the longitudinal shaft having gear connections for driving the wheels of the locomotive. This arrangement has advantages in that it makes the driving part of the locomotive very accessible. On the other hand, it necessitates compensating for the overhanging weight of the engines and driving parts in the mounting of the boiler.

In the present invention I have retained the desirable feature of side mounting of the engines and drive shafts and have made a more uniform distribution of the weight by arranging the drive shaft at one side of the locomotive and the engine at the opposite side of the locomotive and driving the drive shaft from the engine through a train of spur gears arranged under the boiler on a cross frame formed on the locomotive. This structure is not only of particular advantage with a driving scheme of this kind in the manner specified but it provides a convenient mechanism in the train of gears for introducing a speed changing device for varying the gear ratios so that the engine may be handled in accordance with the load. In forming such a speed changing device it is desirable to have it fluid-actuated using the steam of the locomotive for this purpose so that it may be readily accomplished while the engine is in motion. Other features and details of the invention will appear from the specification and claims.

The invention is illustrated in the accompanying drawings as follows:—

Fig. 1 shows a side elevation of a locomotive.

Fig. 2 a plan view of the driving system, partly in section.

Fig. 3 an enlarged sectional view of the speed changing device.

1 marks the frame of the locomotive this having the usual side beams and cross girders, 2 the usual boiler mounted on the frame, 3 the driving axles, $3^a$ the driving wheels, 4 gears on the driving axles, 5 gears meshing with the gears 4, 6 a longitudinal drive shaft on which the gears 5 are mounted, 7 bearings for the drive shaft, some of these bearings being carried by the frame and others by the drive wheels or trucks (not shown) and 8 driving joints in the shaft 6 permitting the free movement of the part of the driving shaft carried with the drive wheels relatively to that part of the driving shaft carried by the frame. So far these parts are of usual construction.

Engines 9 are mounted at the opposite side of the frame and boiler, the crank shafts 10 of such engines being journaled in bearings 11 in the engine frame. The crank shaft has a forward extension carried by a bearing 12, the bearing 12 being mounted through a bracket $12^a$ on the frame.

The train of gears carrying the motion from the crank shaft to the drive shaft comprises the speed changing device which is as follows:—A spur gear 13 is fixed on the crank shaft and meshes with a gear 14 fixed on the shaft 15. The shaft 15 is carried in bearings 16, these bearings being carried in cross beams 17 extending between the sides of the frame 1. A second gear 18 is fixed on the shaft 15, the gear 18 being of a different diameter than that of the gear 14. The gear 14 meshes with a gear 19 and the gear 18 with a gear 20. The gears 19 and 20 are journaled on sliding bushings 21, these bushings being mounted on a shaft 23. The bushings are provided with bearing channels 22 in which the gears 19 and 20 are mounted so that the gears are free to rotate on the bushings but are locked against axial movement relatively thereto. The shaft 23 is journaled in a bearing 24 at one end carried in one of the cross beams and in a sleeve 25 extending from one of the bushings 21. The sleeve 25 is journaled in a bearing 26 on one of the cross beams 17. A gear 27 is fixed on the shaft 23 by means of a key 28 and the gear carries the drivers of friction clutches, one having a driving friction surface 29 engaging a friction surface 31 on the gear 19 and the other having a friction surface 30 engaging a friction surface 32 on the gear 20. The bushings 21 are connected by a pin $21^a$ which is provided with a screw-threaded end $21^b$ operating in a screw-threaded opening $21^c$ in the outside bushing. The pin is locked with the bushing having the sleeve 25 by means of a shoulder 21ᵈ and is provided with a gear 21ᵉ at its outer end which meshes with an internal gear 21ᶠ journaled on the bushing. It will be understood that while but one pin 21ᵃ is shown in the section, ordinarily three of these pins are used in the structure, each of which is provided with a gear 21ᵉ in mesh with the gear 21ᶠ. It will readily be seen, therefore, that by turning the gear 21ᶠ the pins may be adjusted so as to nicely adjust the friction surfaces and maintain them in parallel. The gear 21ᶠ is locked in adjustment by a set screw 21ᵍ.

A fluid-actuated device is used for throwing the clutches and is as follows: The end of the shaft 23 is screw-threaded at 33 and a cylinder 34 has its head screwed on the end of the shaft. A piston 35 operating in the cylinder has its movement conveyed by pins 37 to the sleeve 25, the sleeve having a flange 38 through which the pins 37 extend. A cover 39 is arranged on the cylinder and a port 39ᵃ extends through the cover and cylinder to the side of the cylinder next the shaft 23. A nozzle socket 40 is arranged in the cover and a nozzle 41 extends into this socket. A port 42 extends from the socket to the outer end of the cylinder. The nozzle 41 is divided into two compartments 44 and 45 and the compartment 44 communicates through a port 46 through a ported channel ring 47 to the port 42, the ported channel ring permitting the turning of the nozzle while maintaining communication between the port 46 and port 42. A port 48 extends from the chamber 45 and communicates through a channeled port ring 48ᵃ with the port 39ᵃ, the channeled ring in this instance also maintaining communication between the port 48 and the port 46 as the cylinder rotates on the nozzle. A steam pipe 49 leads to the chamber 44 and a steam pipe 50 to the chamber 45. These steam pipes lead from the boiler with controlling valves actuated from the cab, the valves and valve actuating mechanisms not being shown. It will readily be seen that when steam is thrown on the outer part of the cylinder the clutch surfaces 30 and 32 are thrown into engagement and a driving connection is made between the gear 18 and the gear 27. On the other hand, if steam is put into the inner end of the cylinder the clutch surfaces 30 and 32 are released and the clutch surfaces 29 and 31 are thrown into engagement, thus making a driving connection between the gear 14 and the gear 27 and these gear connections being of different gear ratios a different speed is given to the gear 27 with one connection than the other. It will be noted also that this shift in speed may be readily accomplished without jar through the friction clutches while the locomotive is moving through the fluid actuated clutch controlling mechanism.

The gear 27 meshes with a gear 51 on the drive shaft 6 and thus completes the train of gears between the crank shaft and the drive shaft.

What I claim as new is:—

1. In a geared locomotive, the combination of a frame; an engine mounted on one side of the frame; a longitudinal drive shaft at the opposite side of the frame; a gear connection between the engine and the shaft; and driving axles driven from the shaft.

2. In a geared locomotive, the combination of a frame; an engine mounted on one side of the frame, said engine having a longitudinally extending crank shaft; a longitudinal drive shaft at the opposite side of the frame; a gear connection between the engine and the shaft; and driving axles driven from the shaft.

3. In a geared locomotive, the combination of a frame; an engine mounted on one side of the frame; a longitudinal drive shaft at the opposite side of the frame; a gear connection between the engine and the shaft comprising a train of spur gears having longitudinal axes; and driving axles driven from the shaft.

4. In a geared locomotive, the combination of a frame having side beams and connecting cross beams; an engine mounted outside of one side frame; a longitudinal drive shaft outside the side frame at the opposite side of the locomotive; a gear connection between the engine and the shaft, said gear connection having spur gears, the gears of said gear connection being mounted on cross beams between the side beams; and driving axles driven from the shaft.

5. In a geared locomotive, the combination of a frame; an engine mounted on one side of the frame; a longitudinal drive shaft at the opposite side of the frame; a plural speed gear connection between the engine and shaft; and driving axles driven by the shaft.

6. In a geared locomotive, the combination of a frame; an engine mounted on one side of the frame; a longitudinal drive shaft at the opposite side of the frame; fluid actuated plural speed gear connections between the engine and the shaft; and driving axles driven by the shaft.

7. In a geared locomotive, the combination of a frame; an engine mounted on one side of the frame; a longitudinal drive shaft at the opposite side of the frame; a plural speed gear connection between the engine and the shaft comprising driving and driven shafts, each having two gears, the gears on one shaft meshing with the gears on the other of said shafts and one pair of gears having a different gear ratio than that of the other; drivers on one of said shafts; friction clutches between the drivers and gears on the shaft carrying the drivers; and means setting and releasing the clutches.

8. In a geared locomotive, the combination of a frame; an engine mounted on one side of the frame; a longitudinal drive shaft at the opposite side of the frame; a plural speed gear connection between the engine and the shaft comprising driving and driven shafts, each having two gears, the gears on one shaft meshing with the gears on the other of said shafts and one pair of gears having a different gear ratio than that of the other; drivers on one of said shafts; friction clutches between the drivers and gears on the shaft carrying the drivers; and fluid actuated means setting and releasing the clutches.

9. In a geared locomotive, the combination of a frame having side beams and cross beams; an engine mounted at one side of the locomotive; a longitudinal drive shaft at the opposite side of the locomotive; a gear connection between the engine and the shaft, said gear connection comprising a plural speed mechanism mounted between the side beams; and driving axles driven from the shaft.

10. In a geared locomotive, the combination of a frame having side beams and cross beams; an engine mounted at one side of the locomotive; a longitudinal drive shaft at the opposite side of the locomotive; a gear connection between the engine and the shaft, said gear connection comprising a fluid actuated plural speed mechanism mounted between the side beams; and driving axles driven from the shaft.

In testimony whereof I have hereunto set my hand.

HARRY L. TURNEY.